US007633772B2

(12) United States Patent
Arnold

(10) Patent No.: US 7,633,772 B2
(45) Date of Patent: Dec. 15, 2009

(54) AC POWER DISTRIBUTION SYSTEM WITH TRANSIENT SUPPRESSION AND HARMONIC ATTENUATION

(76) Inventor: Ullrich Joseph Arnold, 20210 Westview Dr., Northville, MI (US) 48167

( * ) Notice: Subject to any disclaimer, the term of this patent is extended or adjusted under 35 U.S.C. 154(b) by 967 days.

(21) Appl. No.: 10/945,420

(22) Filed: Sep. 20, 2004

(65) Prior Publication Data

US 2006/0062029 A1    Mar. 23, 2006

(51) Int. Cl.
*H02M 1/12* (2006.01)
(52) U.S. Cl. .................................... 363/39
(58) Field of Classification Search .............. 363/39, 363/40, 41, 42, 43; 307/105; 323/205, 207
See application file for complete search history.

(56) References Cited

U.S. PATENT DOCUMENTS

| 5,416,458 | A | 5/1995 | Menke et al. |
| 5,434,455 | A | 7/1995 | Kammeter |
| 6,011,705 | A | 1/2000 | Duca et al. |
| 6,127,743 | A * | 10/2000 | Levin et al. .................. 307/105 |
| 6,549,434 | B2 * | 4/2003 | Zhou et al. ..................... 363/39 |
| 6,605,882 | B2 * | 8/2003 | Boudrias et al. ............ 307/105 |

OTHER PUBLICATIONS

MTE Corporation, *Guard AC Plus Three Phase Reactor with Surge Arrestor*, May 2003, 2 pgs.
Power Distribution, Inc., *Powerpak 1000/2*, Mar. 1993, 6 pgs.
General Electric Company, *GE Panelboards*, 1997, 6 pgs.
Power Distribution, Inc., *Powerpak 1000*, Mar. 1993, 6 pgs.
MTE Corporation, *Reactors Provide a Low-Cost Solution to Inverter/Drive Power Quality*, Sep. 1991, 4 pgs.
MTE Corporation, *3-Phase Reactors Line/Load Reactors*, Sep. 1997, 8 pgs.

* cited by examiner

*Primary Examiner*—Adolf Berhane
(74) *Attorney, Agent, or Firm*—MacMillan, Sobanski & Todd, LLC

(57) ABSTRACT

An AC power distribution unit for coupling AC power having a fundamental frequency to a plurality of electrical loads has an enclosure. A power input feed is retained by the enclosure for coupling to a source of the AC power. A plurality of power output feeds is retained by the enclosure for coupling to the plurality of electrical loads. A harmonic mitigation module is retained in the enclosure and is connected in series between the power input feed and the plurality of power output feeds. The harmonic mitigation module bilaterally reduces harmonic current distortion above a predetermined frequency between the power input feed and the plurality of power output feeds.

34 Claims, 4 Drawing Sheets

AC POWER DISTRIBUTION SYSTEM WITH TRANSIENT SUPPRESSION AND HARMONIC ATTENUATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to power distribution systems, and, more specifically, to integrated harmonic distortion cancellation and transient voltage surge suppression within wall-mounted electrical distribution panelboards and point-of-use devices.

In supplying electricity to a building, AC power from a utility is connected via a service entrance to various types of feeder panels and then on to electrical loads connected to branch circuits. Many of the loads that may be supplied on the branch circuits such as computers, electronic ballasts, variable frequency drives, telecommunications equipment, and laboratory equipment, are non-linear loads. It is known that such non-linear loads create a power quality problem known as harmonic distortion because they draw current at other than the frequency of the input AC voltage. Total harmonic distortion, expressed as THD, is measured as a percentage amount of distortion present on the current or voltage sinewave.

Voltage transients or surges are a major problem affecting sensitive electronics including microprocessor-controlled equipment. Power conditioning devices known as transient voltage surge suppression (TVSS) units or surge protection devices (SPDs) are widely used to reduce this problem. SPDs, however, do not remedy harmonic distortion. As the number of non-linear loads in closely coupled electrical circuits increases, the increasing amount of harmonic distortion can lead to malfunctions of sensitive electronics. The problem of harmonic distortion is discussed in I.E.E.E. Standard 519, "Recommended Practices and Requirements for Harmonic Control in Electrical Power Systems".

Increased levels of harmonic current distortion contribute to adverse thermal effects on electrical equipment. Examples of this problem include premature failure of transformers and nuisance tripping of breakers and fuses. This can even occur on circuits where the actual load current would indicate that the circuit is not overloaded.

Harmonic distortion causes current to flow on the neutral conductor. In a balanced three-phase power system supporting linear loads, very little current is normally present on the neutral conductor. However, power systems that supply electrical power to non-linear loads will always have current flowing on the neutral conductor. The amount of current flowing in the neutral conductor can potentially exceed the amount of current flowing in the phase conductor with the most current load. Since there is no overcurrent device on the neutral conductor this can create a serious problem. In severe cases, harmonic distortion has been found to be the cause of electrical fires in buildings.

Harmonic current distortion also causes distortion of the voltage waveshape. This voltage distortion is measured as a percentage of voltage THD. Excessive voltage THD can cause microprocessor-controlled equipment to malfunction. IEEE Standard 519 states that voltage THD must be kept to less than 5% in order to avoid such malfunctions.

For electrical loads such as variable frequency motor drives, which create significant harmonic distortion, it is known to reduce the distortion flowing back to the distribution system or other loads by coupling a harmonic mitigation device in series with the drive. Standalone components such as K-rated transformers and zig-zag transformers are available for this purpose. For other loads such as the switching DC power supplies in computers and other electronics, the level of harmonic distortion created does not justify the expense of deploying a harmonic mitigating transformer with each load since the distortion from one such load is unlikely to cause noticeable problems even though that distortion propagates back up the branch circuit through its feeder panel and then to loads in other branch circuits. When a greater number of such loads are supplied by a feeder panel, however, the cumulative harmonic current distortion of all the devices can easily cause disruptive overheating problems and if left unchecked will cause voltage harmonic distortion levels to approach and exceed the 5% limit. The TVSS module often attached to or integrated into a feeder panel only protects the loads from transients and is ineffective in controlling the harmonic distortion.

SUMMARY OF THE INVENTION

The present invention provides a cost effective and robust solution to the problem of harmonic distortion within the electrical distribution systems of buildings and other facilities by integrating a harmonic attenuation function within feeder panels. Thus, harmonic distortion from loads that may be connected within any particular branch circuit will be substantially confined to that branch circuit, and loads in that branch circuit will be protected from harmonic distortion created in other branch circuits.

In one aspect of the invention, an AC power distribution unit for coupling AC power having a fundamental frequency to a plurality of electrical loads comprises an enclosure. A power input feed is retained by the enclosure for coupling to a source of the AC power. A plurality of power output feeds is retained by the enclosure for coupling to the plurality of electrical loads. A harmonic mitigation module is retained in the enclosure and is connected in series between the power input feed and the plurality of power output feeds. The harmonic mitigation module bilaterally reduces harmonic current distortion above a predetermined frequency between the power input feed and the plurality of power output feeds.

DETAILED DESCRIPTION OF PREFERRED EMBODIMENTS

Figure 1:
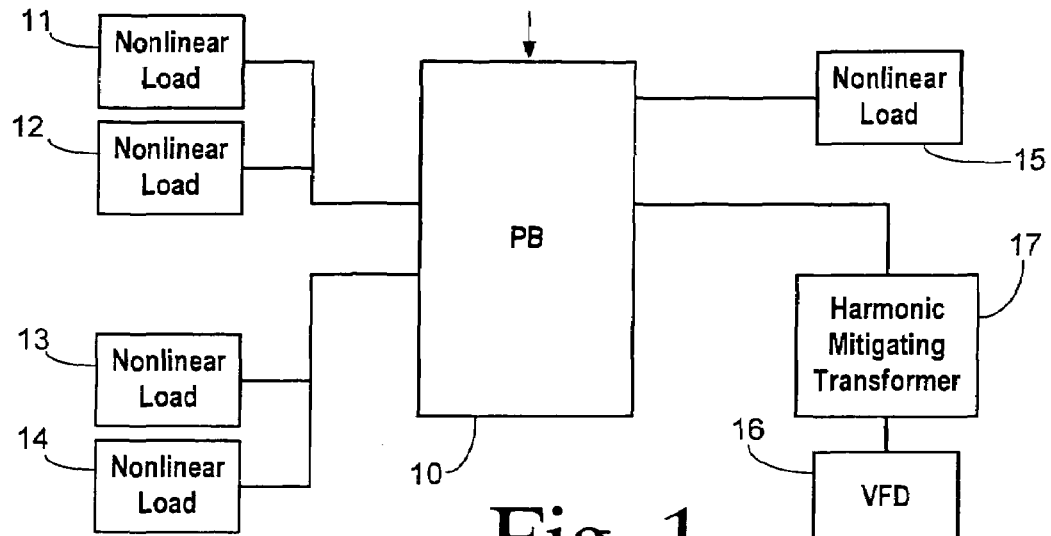
FIG. 1 is a block diagram showing nonlinear loads coupled with an electrical distribution panelboard or circuit breaker panel.

Referring now to FIG. 1, an electrical distribution system subject to harmonic distortion problems includes a panelboard 10 coupled to nonlinear loads 11-15. The nonlinear loads can be any arbitrary loads such as electronic lighting ballasts, switching power supplies for computers or other electronic equipment. Another nonlinear load comprises a variable frequency drive (VFD) 16 powered by panelboard 10. It is known to limit harmonic distortion that propagates from a VFD to other devices by introducing a harmonic mitigating device 17 to the electrical distribution system between VFD 16 and panelboard 10. Harmonic mitigating device 17 may typically comprise a transformer (such as a zig-zag transformer for canceling harmonic distortion) or a load reactor or a line reactor, for example. Although the known harmonic mitigating device 17 reduces harmonic distortion that propagates from VFD 16 to other devices, harmonic distortion to or from nonlinear loads 11-15 is not addressed by the prior art electrical distribution systems. The problems associated with harmonic distortion are especially severe in distribution systems with multiple panelboards having many branch circuits or in multiple phase systems that supply nonlinear loads and that also supply power to a large number of unprotected sensitive electronic loads.

Figure 2:
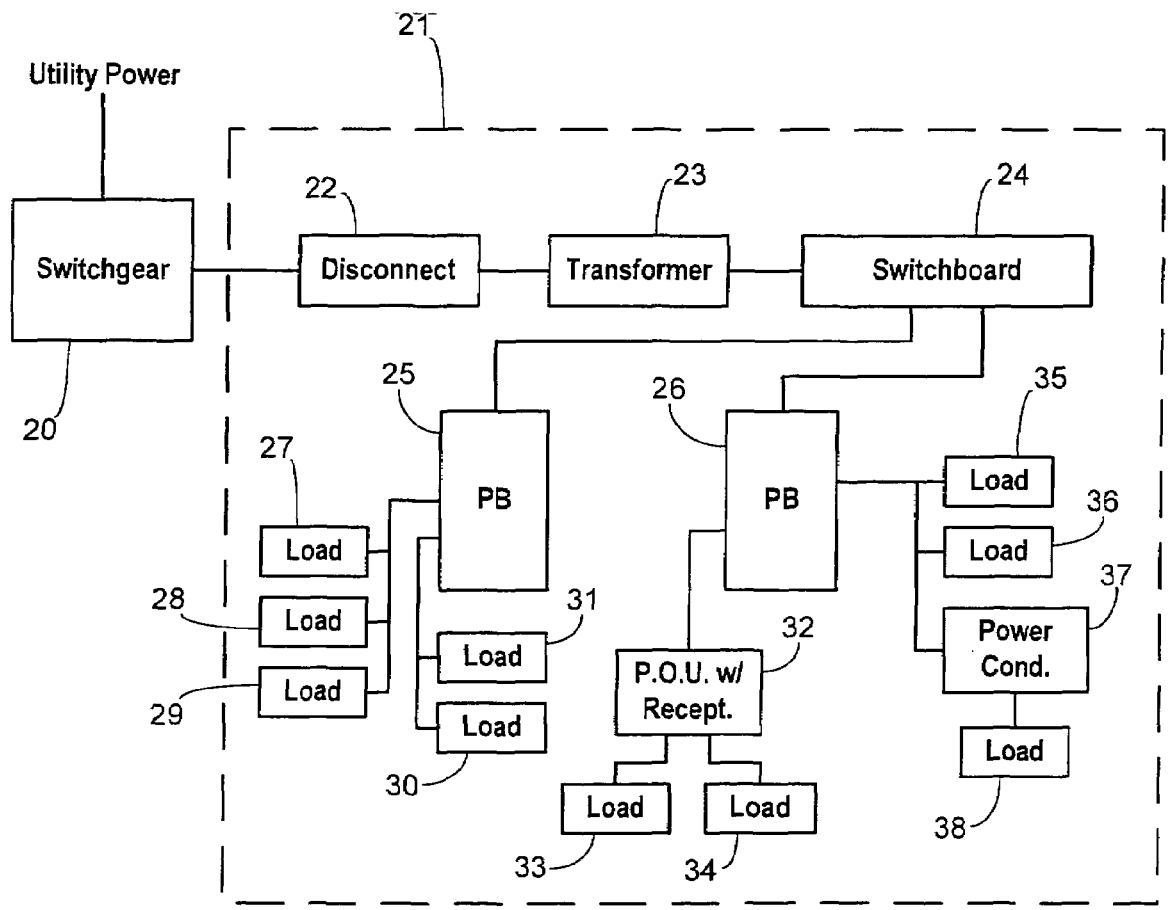
FIG. 2 is a block diagram showing an example of an electrical power distribution system for deploying the present invention.

FIG. 2 shows an overall electrical distribution system architecture in which the present invention may be employed. Utility power is provided to a switchgear 20, which in turn supplies electrical power to a building 21. The building service entrance comprises a disconnect 22, a transformer 23, and a switchboard 24. Switchboard 24 supplies panelboards 25 and 26.

One configuration of the present invention incorporates an electrical distribution panelboard or circuit breaker panel with harmonic mitigation (e.g., harmonic filtering) at the branch supply level for plug-in or hardwired single or 3-phase loads. An integrated harmonic mitigation module is placed in series with all loads supplied by the respective distribution unit of the invention, as described in more detail below.

The present invention is especially advantageous when implemented within a panelboard (e.g., load control center), such as panelboard 25 in FIG. 2. Panelboard 25 has a first branch circuit to which loads 27-29 are connected and a second branch circuit to which loads 30 and 31 are connected. The loads may comprise any combination of linear or nonlinear loads. Conventional wiring and receptacles are provided for connecting any arbitrary loads as is known in the art.

The present invention may also be implemented at a distribution level below that of the panelboard, either alone or in combination with harmonic mitigation also being obtained at the panelboard level. Thus, panelboard 26 has a first branch circuit connected to a point-of-use (POU) device which contains plug-in receptacles for connecting with loads 33 and 34. POU device 32 includes a harmonic mitigation module for use in connecting with electrical devices which may not themselves provide harmonic distortion mitigation, may be a source of harmonic distortion, or may be sensitive electronic devices requiring protection from harmonic distortion created by other devices located elsewhere on the electrical distribution system. Panelboard 26 has a second branch circuit to which loads 35 and 36 are connected. Yet another embodiment of the invention is depicted by power conditioner 37 which is also connected to panelboard 26 in this branch circuit and drives a nonlinear load 38. Power conditioner 37 incorporates a harmonic mitigation module and is similar to POU device 32 except that it lacks receptacles (i.e., load 38 is hardwired to power conditioner 37).

Panelboards have certain size limitations because of their typical wall mounting (e.g., flush or surface mounting to wall studs). In addition to the normal function of providing overcurrent protection using circuit breakers or fuses, panelboards frequently incorporate an integral surge protection device within its enclosure. By locating the surge protection device closer to the input power feeds and farther from the loads, enhanced surge protection can be obtained. In contrast, the prior art has sought to place harmonic mitigation devices as close as possible to the nonlinear loads generating the harmonic distortion. In addition, harmonic mitigating devices such as transformers tend to be rather bulky and have been placed in their own enclosure or in the same enclosure as the protected device.

Figure 3:
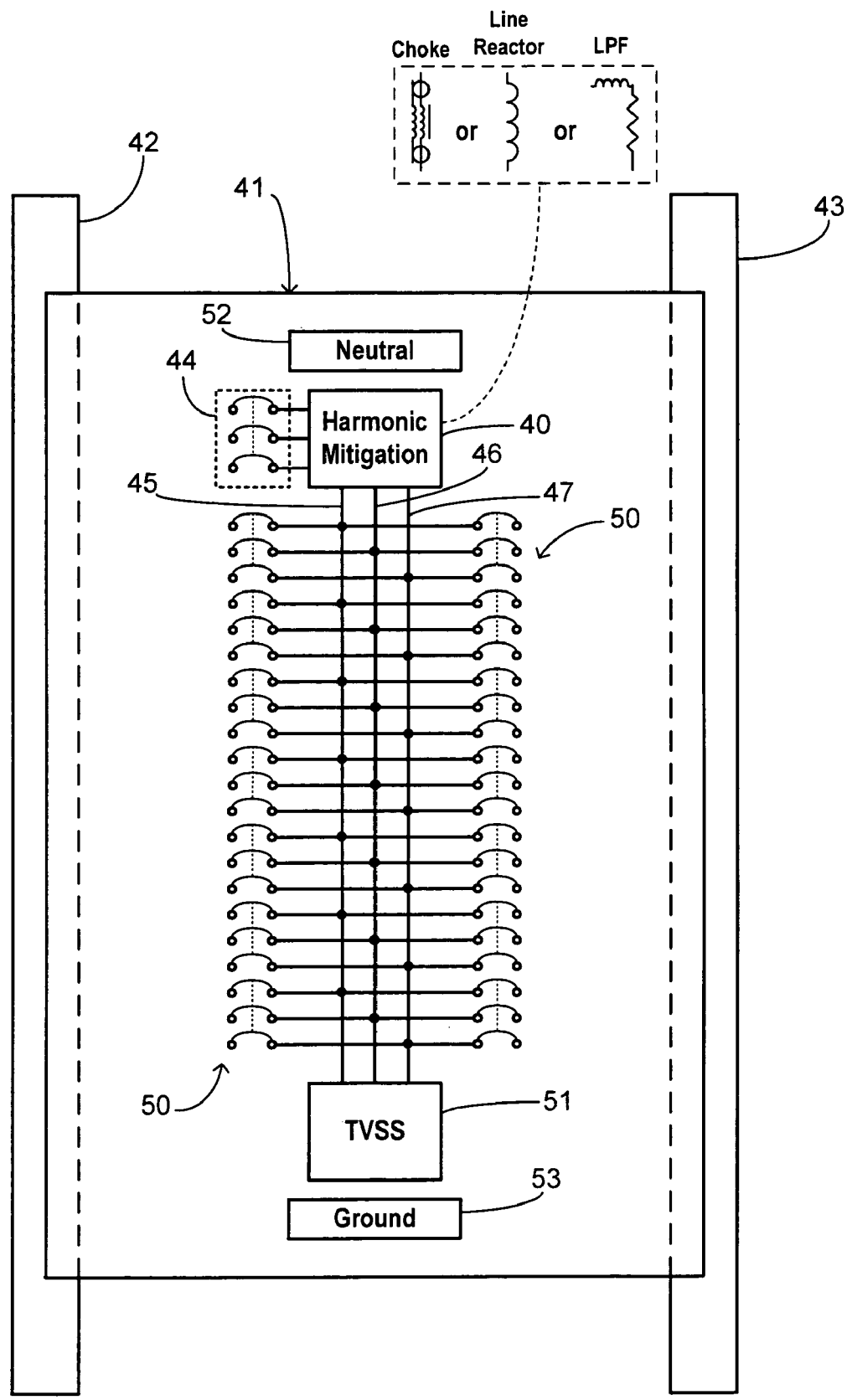
FIG. 3 is a diagrammatic view of a panelboard according to a first embodiment of the invention.

FIG. 3 shows one preferred embodiment of the present invention in greater detail wherein a harmonic mitigation module 40 is integrated in a panelboard 41. Panelboard 41 is mounted to studs 42 and 43 within a wall. Three-phase power is provided to a main circuit breaker 44 (e.g., by wires routed into panelboard 41) and to harmonic mitigation module 40. Harmonic mitigation module 40 is a three-phase device which couples the three phases to load line feeders (or phase busses) 45, 46, and 47. Load line feeders 45-47 may comprise busbars, for example. A plurality of overcurrent devices (e.g., circuit breakers) 50 are coupled to respective ones of load line feeders 45-47 for connection to separate branch circuits in a conventional manner. A TVSS module 51 is also coupled to each load line feeder. Neutral and ground structures 52 and 53 are also deployed in panelboard 41 as is known in the art.

Input power is provided to panelboard 41 typically having a fundamental frequency of 60 Hertz. The nonlinear loads create harmonic distortion mainly at odd harmonics of this fundamental frequency. Depending upon the types of loads, significant distortion may or may not be created at the third harmonic. In a single-phase uninterruptable power supply, for example, the third harmonic may be the largest component of the current distortion. In some cases, overall total harmonic current may be nearly equal in magnitude or exceed the fundamental current. In some three-phase devices, on the other hand, the greatest harmonic component may be at the fifth harmonic. Although certain types of line reactors or other lowpass filters can be provided for mitigating the fifth harmonic and above without requiring a large package size, mitigating the third harmonic typically requires bulky components such as a transformer.

In one preferred embodiment of the invention, harmonic mitigation module 40 is comprised of a filter such as a choke, a line reactor, or other lowpass filter impedance in a configuration that greatly reduces odd order harmonic current distortion at above the third harmonic frequency (i.e., at the fifth harmonic and above) but that leaves harmonic current at the third harmonic frequency substantially unreduced. Thus, problems of harmonic current distortion propagating within an electrical distribution system and creating harmonic voltage distortion may be greatly reduced with a device that can be packaged within a normal panelboard enclosure suitable for wall mounting. Most commercially available line reactors are dimensioned such that packaging within the depth of a standard enclosure may not be feasible. However, high volume production designs are easily modifiable to provide the same electrical properties in a package size that can be accommodated in a standard enclosure. A line reactor can be used having the electrical performance of the Guard-AC line reactor from MTE Corporation or similar line reactors from suppliers such as Mag-Tran Equipment Corporation, L/C Magnetics, Trans-Coil, Inc., and Myron Zucker, Inc. The line reactor is preferably hardwired between a power input feed and the power busbars of a conventional panelboard enclosure. The height of an enclosure may need to be increased in order to package the harmonic mitigation module, but the enclosure thickness and width are unmodified so that the enclosure can still be located between the studs of a standard framed wall.

Figure 4:
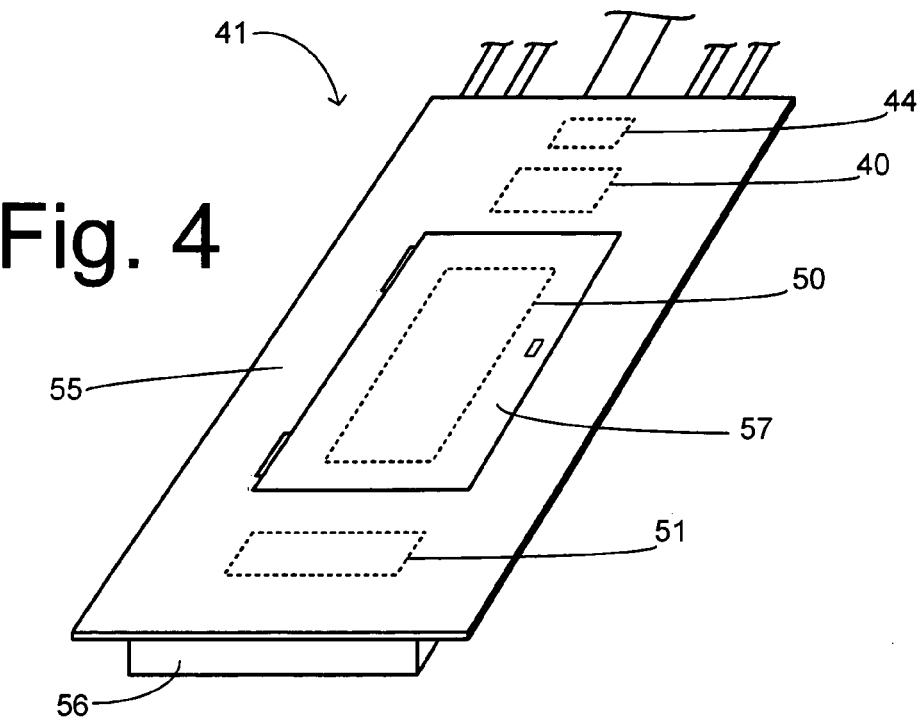
FIG. 4 is a perspective view of the panelboard of FIG. 3.

FIG. 4 shows a perspective view of panelboard 41 wherein the enclosure includes a dead front 55 connected to a box 56. An access door 57 is mounted to dead front 55 and may be opened to gain access to overcurrent devices 50. Harmonic mitigation module 40, main breaker 44, and TVSS module 51 are all mounted in box 56 behind dead front 55. Thus, panelboard provides front only access.

Figure 5:
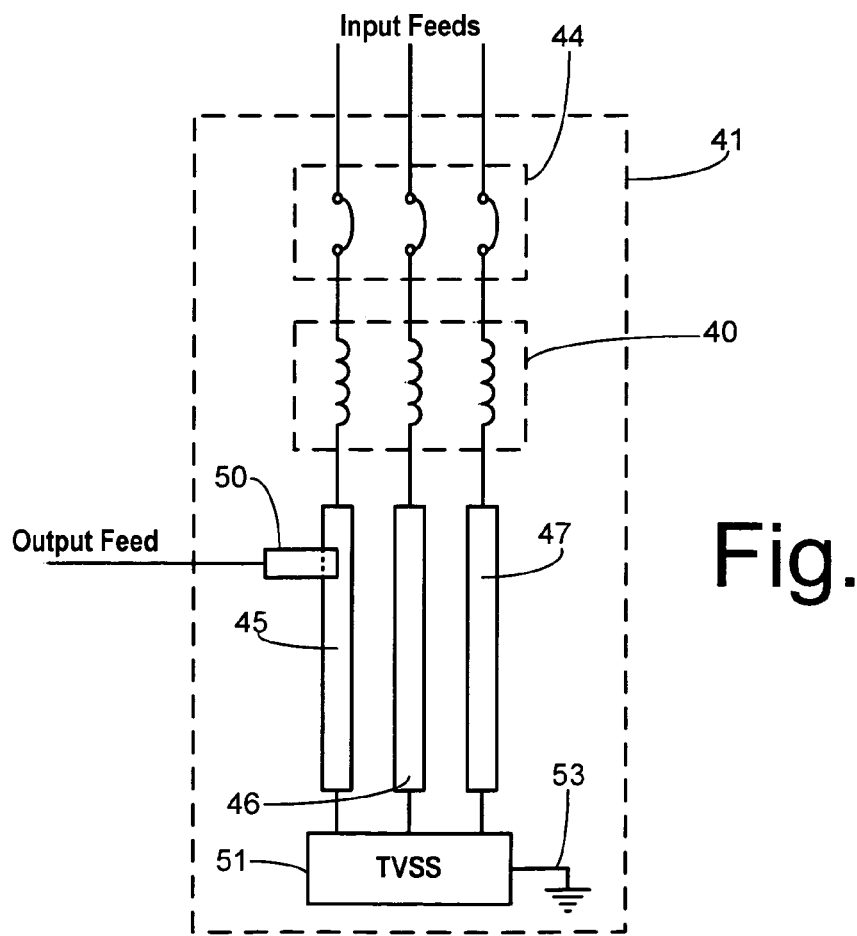
FIG. 5 is a schematic view of a panelboard of the invention.

Referring now to FIG. 5, a schematic view of the invention illustrates input power feeds being coupled to main breaker 44 in a three-phase, four-wire system. By way of example, harmonic mitigation module 40 could be comprised of a three-phase line reactor with individual inductors connected in series in each phase to a respective phase bus 45, 46, and 47. A circuit breaker 50 mounts to phase bus 45 and provides an output feed to a respective branch circuit.

Since harmonic mitigation module 40 is connected in series with any loads connected to panelboard 41, harmonic current distortion is bilaterally reduced and prevented from spreading within the electrical distribution system. As previously described, line reactors are one preferred type of harmonic mitigation device in view of their ability to reduce fifth order harmonics and higher in a package size that is easily accommodated in a panelboard enclosure. In addition, other types of lowpass filters can be employed, either active or passive. Furthermore, the present invention may be employed in other distribution enclosures such as a point-of-use device with output receptacles or a hardwired output for specific loads.

Figure 6:
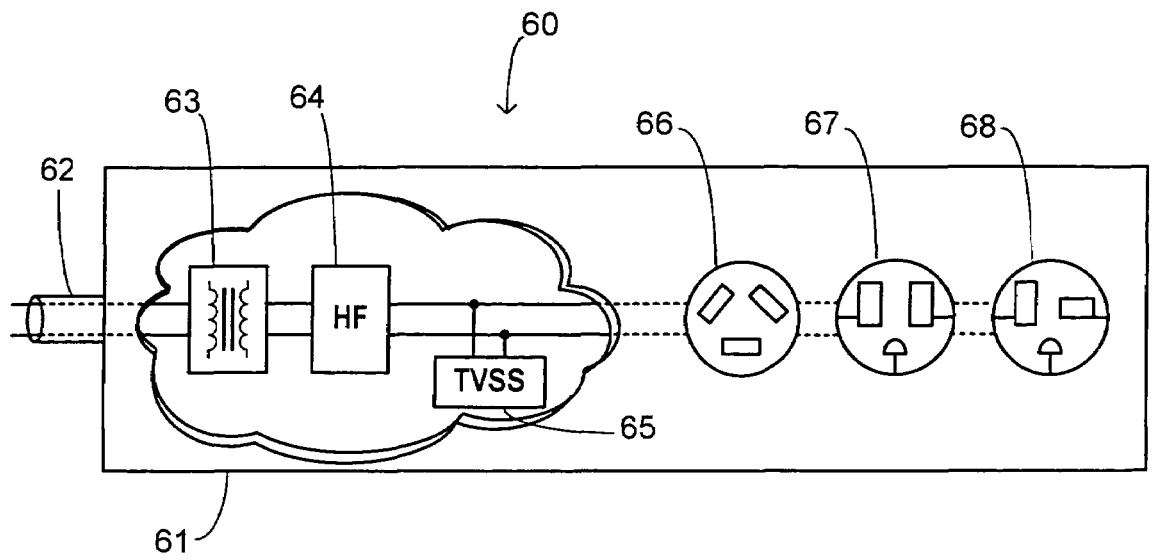
FIG. 6 is a partially broken-away plan view of a point-of-use unit of the present invention.

FIG. 6 shows a point-of-use (POU) device 60 including an enclosure 61 which preferably may be wall mounted (e.g., surface mounted) but may also be floor mounted or suspended in a ceiling, for example. A power input feed 62 is coupled to an optional isolating transformer 63 connected to harmonic filter 64. Isolating transformer 63 may comprise a K-rated type transformer, a shielded isolation type transformer, a zig-zag type transformer, or a ferroresonant voltage regulator type transformer, for example. Among other things, isolating transformer 63 may attenuate noise energy propagating through the point-of-use unit and reduce the harmonic current distortion at the third harmonic frequency. An optional TVSS module 65 is connected to the output of harmonic filter 64 in parallel with a plurality of receptacles 66-68. An overcurrent device (e.g., fuse block or circuit breaker) for TVSS module 65 may also be included depending upon the type of TVSS module used.

Figure 7:
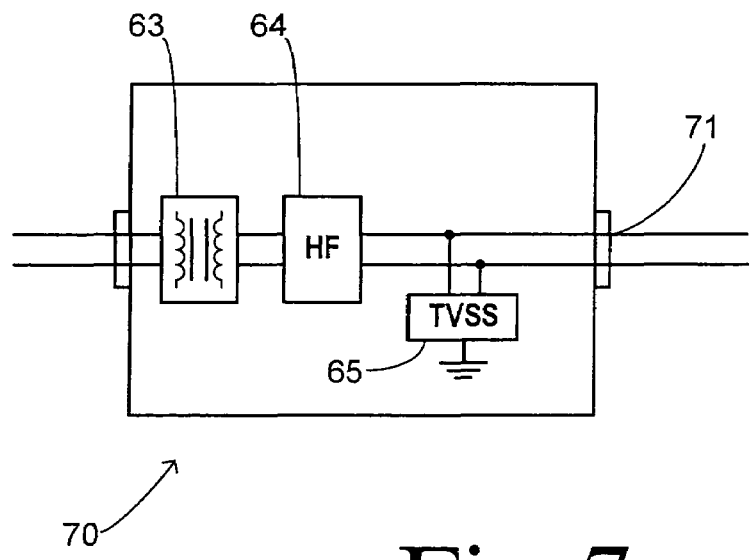
FIG. 7 is a block diagram showing a power conditioning unit of the present invention.

FIG. 7 shows an alternative embodiment of a power conditioning device 70 similar to POU 60, but lacking output receptacles. Instead, a dedicated hardwired output 71 is employed.

What is claimed is:

1. An AC power distribution unit for coupling AC power having a fundamental frequency to a plurality of electrical loads, comprising:
   an enclosure;
   a power input feed retained by said enclosure for coupling to a source of said AC power;
   a plurality of power output feeds retained by said enclosure for coupling to said plurality of electrical loads; and
   a harmonic mitigation module retained in said enclosure and connected between said power input feed and said plurality of power output feeds, said harmonic mitigation module bilaterally reducing harmonic current distortion with respect to said plurality of electrical loads above a predetermined frequency between said power input feed and said plurality of power output feeds, wherein said predetermined frequency is comprised of a predetermined odd harmonic of said fundamental frequency so that harmonic current distortion is reduced at odd harmonics above said predetermined odd harmonic of said fundamental frequency, and wherein harmonic current distortion at said predetermined odd harmonic is substantially unreduced.

2. The unit of claim 1 further comprising:
   a surge suppression device mounted within said enclosure and coupled to said power output feeds for operating with said electrical loads.

3. The unit of claim 1 in a panelboard configuration further comprising:
   a plurality of overcurrent protection elements mounted within said enclosure, each overcurrent protection element providing a respective power output feed.

4. The unit of claim 1 further comprising:
   an isolating transformer mounted within said enclosure and coupled between said power input feed and said plurality of power output feeds, wherein said isolating transformer substantially reduces said predetermined odd harmonic.

5. The unit of claim 1 in a point-of-use configuration further comprising:
   a plurality of receptacles supported on said enclosure and connected to respective power output feeds.

6. The unit of claim 5 further comprising:
   an isolating transformer mounted within said enclosure and coupled between said power input feed and said plurality of power output feeds, wherein said isolating transformer is selected from the group comprising a K-rated type transformer, and isolation type transformer, a zig-zag type transformer, and a ferroresonant voltage regulator type transformer.

7. The unit of claim 5 further comprising:
   a surge suppression device mounted within said enclosure and coupled to said power output feeds for operating with said electrical loads.

8. The unit of claim 1 wherein said harmonic mitigation module comprises a line reactor.

9. The unit of claim 1 wherein said harmonic mitigation module comprises a lowpass filter.

10. The unit of claim 1 wherein said harmonic mitigation module comprises a choke filter.

11. An AC power distribution system for coupling AC power having a fundamental frequency from an input power feed to a plurality of electrical loads, comprising:
    an enclosure for wall mounting to provide front access;
    a plurality of load line feeders within said enclosure, wherein said load line feeders include a plurality of overcurrent protection elements coupled to a plurality of busbars;
    a harmonic filter adapted to attenuate harmonic current distortion having predetermined frequencies, said harmonic filter mounted within said enclosure and coupled to said load line feeders for operating with said electrical loads, wherein said harmonic filter bilaterally reduces harmonic current distortion above a predetermined odd harmonic frequency of said fundamental frequency so that harmonic current distortion is reduced at odd harmonics above said predetermined odd harmonic of said fundamental frequency while harmonic current distortion at said predetermined odd harmonic frequency is substantially unreduced.

12. The system of claim 11 further comprising:
a surge suppression device mounted within said enclosure and coupled to said load line feeders for operating with said electrical loads.

13. The system of claim 11 wherein said AC power has a plurality of phases and wherein said harmonic filter comprises separate filter elements each coupled to operate for a respective phase.

14. The system of claim 11 wherein said harmonic filter comprises a line reactor.

15. The system of claim 11 wherein said harmonic filter comprises a lowpass filter.

16. The system of claim 11 wherein said harmonic filter comprises a choke filter.

17. The system of claim 11 further comprising:
a main breaker mounted within said enclosure and coupled between said harmonic filter and said input power feed.

18. The system of claim 11 configured as a panelboard wherein said enclosure is adapted for mounting between wall studs, wherein said enclosure comprises a dead front and an access door, and wherein said harmonic filter is concealed behind said dead front.

19. The system of claim 11 wherein said enclosure is without any transformer.

20. The system of claim 11 configured as a point-of-use unit wherein said load line feeders each include a respective receptacle adapted to connect with a respective one of said electrical loads.

21. The system of claim 20 further comprising:
an isolating transformer mounted within said enclosure and coupled with said harmonic filter, said transformer adapted to attenuate noise energy propagating through said point-of-use unit and to reduce said harmonic current distortion at said third harmonic frequency.

22. The system of claim 21 wherein said isolating transformer is a zig-zag transformer.

23. The system of claim 21 wherein said isolating transformer is K-rated.

24. An electrical panelboard for supplying AC power having a fundamental frequency from an input power feed to electrical loads on a plurality of branch circuits, said panelboard comprising:
a wall-mount enclosure;
a phase bus in said enclosure;
a plurality of circuit breakers in said enclosure connected to said phase bus and having an output terminal for coupling to a respective branch circuit;
a TVSS module in said enclosure coupled with said branch circuits for suppressing transient voltages and surges to said branch circuits; and
a harmonic mitigation module in said enclosure coupled with said branch circuits for attenuating harmonic current distortion above a predetermined frequency, wherein said harmonic filter bilaterally reduces harmonic current distortion above a predetermined odd harmonic frequency of said fundamental frequency so that harmonic current distortion is reduced at odd harmonics above said predetermined odd harmonic of said fundamental frequency while harmonic current distortion at said predetermined odd harmonic frequency is substantially unreduced.

25. The electrical panelboard of claim 24 wherein said wall-mount enclosure is adapted for flush mounting between standard wall studs.

26. The electrical panelboard of claim 24 wherein said wall-mount enclosure is adapted for surface mounting.

27. The electrical panelboard of claim 24 wherein said harmonic mitigation module comprises a line reactor.

28. The electrical panelboard of claim 24 wherein said harmonic mitigation module comprises a lowpass filter.

29. The electrical panelboard of claim 24 wherein said harmonic mitigation module comprises a choke filter.

30. The electrical panelboard of claim 24 wherein said input power feed includes a plurality of phases, wherein said electrical panelboard includes a plurality of phase busses in said enclosure, and wherein said electrical panelboard includes groups of circuit breakers coupled to each of said phase busses.

31. The electrical panelboard of claim 30 further comprising a ground bus, wherein said TVSS module is coupled between said phase busses and said ground bus.

32. The electrical panelboard of claim 30 wherein said harmonic mitigation module is coupled between said phase busses and said input power feed.

33. The electrical panelboard of claim 30 further comprising a main breaker, wherein said harmonic mitigation module is coupled between said main breaker and said phase busses.

34. The unit of claim 1 wherein said predetermined odd harmonic of said fundamental frequency is the third harmonic.

* * * * *